United States Patent [19]

Meltsch

[11] Patent Number: 4,731,272
[45] Date of Patent: Mar. 15, 1988

[54] SHRINKABLE CABLE SLEEVE

[75] Inventor: Hans-Juergen Meltsch, Schwerte-Ergste, Fed. Rep. of Germany

[73] Assignee: RXS Schrumpftechnik-Garnituren GmbH, Hagen, Fed. Rep. of Germany

[21] Appl. No.: 938,154

[22] Filed: Dec. 4, 1986

[30] Foreign Application Priority Data

Dec. 12, 1985 [DE] Fed. Rep. of Germany ....... 3543930

[51] Int. Cl.$^4$ ...................... B32B 31/26; H02G 15/08
[52] U.S. Cl. ......................................... 428/36; 174/92; 174/93; 174/DIG. 8
[58] Field of Search ............. 428/36; 174/92, DIG. 8, 174/93; 156/84, 85, 86

[56] References Cited
U.S. PATENT DOCUMENTS 4,332,849  6/1982  Barkus et al. ................. 174/DIG. 8
4,380,686  4/1983  Moisson ............................ 428/167
4,472,222  9/1984  Moisson et al. ...................... 428/36
4,500,371  2/1985  DeGroot ............................... 428/36
4,626,458  12/1986  Pithouse et al. ..................... 174/92
4,639,546  1/1987  Meltsch ................................ 174/92
4,656,316  4/1987  Meltsch ................................ 174/92

Primary Examiner—John E. Kittle
Assistant Examiner—Beth A. Bozzelli
Attorney, Agent, or Firm—Hill, Van Santen, Steadman & Simpson

[57] ABSTRACT

A shrinkable cable sleeve which is composed of a shrinkable envelope having a meltable inside layer and an inner cable insert. The inner cable insert is composed of a plurality of layers, wherein one layer is activatable by the application of heat, and the plurality of layers includes a basic foil layer and reinforcing elements which may be in a separate layer or embedded in the activatable layer. During assembly, a pressure tight cable sleeve will be produced by fusing the two activatable layers together.

34 Claims, 12 Drawing Figures

SHRINKABLE CABLE SLEEVE

BACKGROUND OF THE INVENTION

The invention relates to a shrinkable cable sleeve composed of a shrinkable envelope and of an inner cable sleeve insert which is formed of a plurality of layers.

Protective inserts, which are usually composed of a plurality of layers lying above one another and which comprise adaptable formations in their ends for the compensation of diameter differences have heretofore been employed in shrinkable cable sleeves. An example of a protective insert is disclosed in U.S. Pat. No. 4,380,686 and European Pat. No. 00 25 691, both of which claim priority from the same application in the United Kingdom. In the insert of this U.S. patent, both ends have tongues fashioned articulately to converge. Because of this, the continuous manufacturing of such a cable sleeve insert must occur perpendicular to the axis of the insert. This means that the length of these cable sleeve inserts are always the same given a perscribed shape. A change in length is not possible. Thus, the length of the cable sleeve is also defined by the cable sleeve insert. Furthermore, the strength or, respectively, dimensional stability of these cable sleeve inserts in essentially defined in a radial direction by the layer structure wherein the thickness of the layers and the material employed are the decisive factors. Given cable sleeves, which are charged with internal pressure, certain difficulty will thus, occur with respect to pressure resistance.

SUMMARY OF THE INVENTION

The object of the present invention is to create a shrinkable cable sleeve which is employable in a universal fashion with respect to its size and with respect to its inside pressure charging. The objects are achieved in accordance with the invention with an improvement in a cable sleeve which is composed of a shrinkable envelope and an inner cable sleeve insert which is formed of a plurality of layers. The improvements are that the cable sleeve insert includes a layer composite having a basic foil layer which is distributed over the full surface of the insert, a layer of activatable material when subjected to heat and reinforcing elements which may be in a separate layer or may be embedded in the activatable material.

Advantages of the cable sleeve of the invention are that a blank for the cable sleeve insert given the simplest possible, continuous band-like manufacture can be cut to the required sizes and length because no priviledge direction must be taken into consideration with regard to the design. Individual tailoring for special cases is thus obtainable without any problems. The shrinkage envelope is then applied over the wound and adapted cable sleeve insert and is shrunken thereon. Also, another advantage is that the reinforcements are integrated into the cable sleeve insert and these combine with the basic foil and with the layer of activatable material to yield a high strength for the cable sleeve or fitting charged with pressurized gas. What is achieved by means of the activatable layer of the cable sleeve insert is that an intimate union between the cable sleeve insert provided with the reinforcing element and the meltable inside coating of the shrinkable envelope will occur during the melting operation. A composite member of high strength is obtained in this way.

Embedding the reinforcing elements in the cable sleeve insert is also especially advantageous because the shrinkable envelope can then be shrunken onto the insert without being impeded by supporting elements. Up to now, shrinkable envelopes having appropriate inclusions were standard for such applications. In that the edge region of the cable sleeve inserts are deformable, these regions no longer have to be provided with corresponding recesses, featherings or the like. As a result of the simplicity of these cable sleeve inserts, however, additional incisions can also be present without problems and these can be subsequently provided if needed. These facts facilitate the manufacture of such a cable sleeve insert and also make them universably usable.

The reinforcing elements integrated into the cable sleeve inserts can be composed of numerous materials and can be introduced or respectively applied in a great variety of shapes. Thus, it is also possible to form the reinforcing elements in the form of thickenings or of a thickened application of the activatable layer of the cable sleeve insert. This type of cable sleeve insert is particularly favorable in manufacture since no additional inclusions whatsoever are required. The shrinkable envelope of the cable sleeve is thereby uncritical within broad limits since the same execution, for example, as a continuous hose cut as needed can be employed even in the most different applications.

Other embodiments of the invention and objects will be readily apparent from the following description, drawings and claims.

DESCRIPTION OF THE PREFERRED EMBODIMENTS

Figure 1:
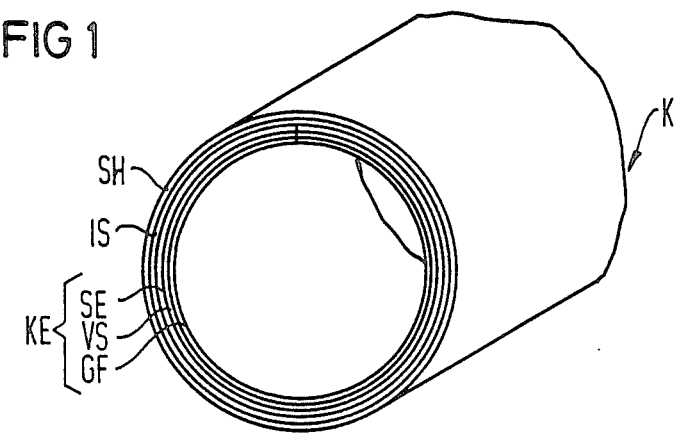
FIG. 1 is a perspective end view of a fundamental structure of a cable sleeve of the present invention comprising a shrinkable envelope and the internally disposed cable sleeve insert.

The principles of the present invention are particularly useful when incorporated in a cable sleeve generally indicated at K in FIG. 1. The cable sleeve K includes an outer shrinkable envelope SH which has an inside layer IS which is composed of a material meltable under the action of heat, for example, one of the standard hot-melt adhesives. The sleeve K also includes the cable sleeve insert KE, which can first by applied independently of the shrinkable envelope SH on the cable or splice area. The insert KE is illustrated as having a butt joint for the sake of simplicity; however, it can be adapted to the respective desired diameter by laying the longitudinal edges on top of one another to provide an overlap. In accordance with the inventions, the cable sleeve insert KE is composed of a plurality of layers of different materials lying one on top of the other which meet the respective demands. These demands are principally related to the permeation protection, temperature protection and to the required strength whereby considerations regarding the adaptability must also be taken into consideration for this last demand.

Figure 4:
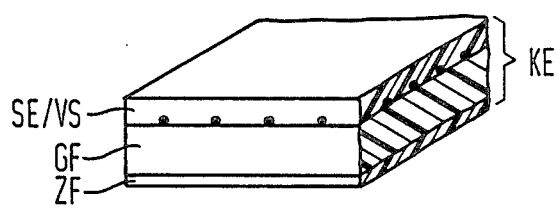
FIG. 4 is a partial perspective view with portions broken away for purposes of illustration of a three-layer format having embedded reinforcing elements.

The cable sleeve insert KE is initially composed of a composite having a basic foil GF, which under certain conditions, can also be provided with an additional cover foil ZF (see FIG. 4). Also, applied to the basic foil GF are reinforcing elements VS which can be fashioned either as a planar layer or sheet or a grid-like arrangement of individual elements or can also be formed by a continuous surface. Then, situated over this layer of reinforcing elements VS is a layer SE which is activatable upon the application of heat and can be a material such as a known hot-melt adhesive material. The overall formation of this cable sleeve insert KE is planar and requires no incisions, featherings or the like so it can be manufactured in a simple method as a band-shaped element which can be cut to any desired size or shape to make the insert for the cable sleeve K. During the shrinking process, the two activatable layers, the inside layer IS of the shrinkable layer SH and the layer SE of the cable sleeve insert KE, are melted and thereby fuse into an intimate bond with one another so that an especially stable structure is obtained. This structure even meets the demands for a cable system which are charged with an internal pressure. In this way, the cable sleeve insert KE is employed in conjunction with the shrinkable collars or hoses for pressure tight shrink sleeves as well as for pressure tight envelopes and cable repairs.

Depending on the format and design of the individual layers of the cable sleeve insert KE, a structure, which is relatively flexible and also rigid, can be produced in the assembled condition. Thus, for example, cable sleeve inserts in the form of half-shells are also possible. These half-shells are relatively rigid, are aligned with one another along the parting seams with corresponding fixing means and are held together. Hereto, the activatable layer forms a firm union with the shrinkable envelopes so that an especially pressure-resistant embodiment is obtained.

Highly advantageous in all of these structures is the fact that the reinforcing elements are respectively integrated in the cable sleeve insert so that the shrinkable envelope does not receive the required strength until it enters into the union with the cable sleeve insert. The temperature protection as well as the permeation protection are also integrated into the cable sleeve inserts so that the shrinkable envelope is also freed of these problems which are intensified due to the shrinkability.

Figure 2:
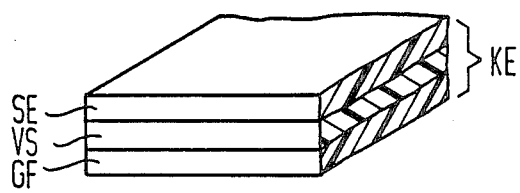
FIG. 2 is a partial perspective view with portions broken away for purposes of illustration of a three-layer format or composite for the cable sleeve insert.

An example of a composite of individual layers for the cable sleeve insert KE is illustrated in FIG. 2. In this, a basic foil GF is composed of a permeation tight material, such as metal foils, for example, aluminum or other highly permeation tight plastic foils. The strength of the basic foil GF can be improved in and of itself by means of embedding or applying reinforcing elements in the form of a grid, weaves or the like so that it is more suitable for the following layers. This is then followed by a layer of reinforcing elements VS which are covered by the activatable layer SE. As already indicated, additional cover foils for partial or full covering can also be applied as needed. Suitable for this purpose, for example, are plastic foils, such as plastic material sold under the tradename Hostafan* or thermo setting plastics which could potentially be formed as half-shells. Additional covering or cardboard or electrical press board can also be employed for specific applications. Additional cover foils of fiber glass fabrics or of at least briefly temperature-resistant materials can also be employed for this purpose. Even with cover foils over the individual layers, the inventive idea regarding this simple, planar fashioning and regarding the layer composite is of significance as indicated in FIG. 2 with the layers GF, VS and SE.

(Polyterephthalate is a particular plastic covered by this trademark)

Figure 3:
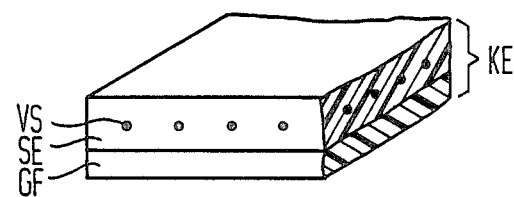
FIG. 3 is a partial perspective view with portions broken away for purposes of illustration of a two-layer format having embedded reinforcing elements.

An embodiment of the layer composite for a cable sleeve insert KE is illustrated in FIG. 3 and includes a reinforcing element VS in the form, for example, of a grid weave being embedded in the activatable layer SE. Given this interlacing composite layer VS-SE, the reinforcing elements are composed, for example, of grid-like weave of reinforcing fiber such as fiber glass or plastic fibers. The basic foil GF is executed in a way already set forth.

Yet another embodiment of the insert KE is a combination of the already described feature and is illustrated in FIG. 4. For example, the embedding of the reinforcing elements VS in the activatable layer SE can thus, be viewed as a single layer SEVS. The basic foil GF lies therebelow and continues to be covered with the cover or auxiliary foil ZF as previously described.

Figure 5:
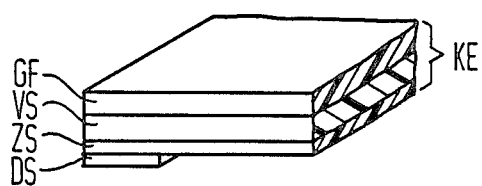
FIG. 5 is a partial perspective view with portions broken away for purposes of illustration of a three-layer format comprising an additional strip-shaped auxiliary layer along one edge of the cable sleeve insert.

In yet another embodiment of the cable sleeve insert KE (FIG. 5), the basic foil GF is coated with an auxiliary layer of a type set forth. The auxiliary layer ZS, however, does not have an adhesive or respectively sealing property and thus, does not adhere particularly well and tightly to the bounded article, for example, a cable introduced into the cable splice. In order to also be able to guarantee adequate tight connection here, an edge region which must be applied tight onto the cable is coated with a sealing layer DS, for example, one of a traditional hot-melt adhesive. Viscously plastic sealing compounds or the like are also suitable for this purpose.

Figure 6:
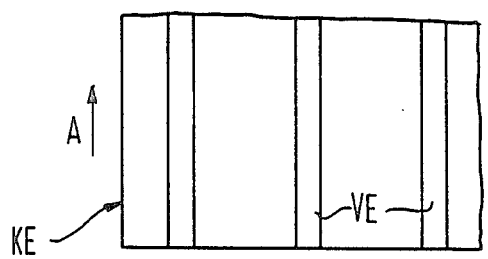
FIG. 6 is a partial plan view with layers removed illustrating laterally spaced reinforcing elements extending in an axial direction of the cable sleeve insert.

The individual elongated reinforcing elements can be arranged in different patterns and sequences. For example, as illustrated in FIG. 6, elongated reinforcing elements VE are provided in a corresponding layer of the cable sleeve insert KE and extend in an axial direction A. The spacing from one another as well as the length of the reinforcing elements VE are selected on a case by case basis whereby the manufacturing direction here again coincides with the later axial direction of the cable sleeve insert KE so that the continuous band-shaped manufacturing is also possible. The cable sleeve insert KE can thus be cut from this band-shaped piece in the required lengths.

Figure 7:
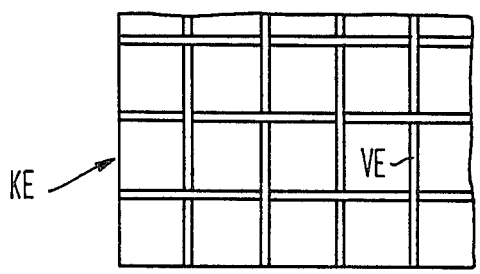
FIG. 7 is a plan view with layers removed showing a grid-shaped pattern of reinforcing elements having individual elements proceeding parallel to the edges of the insert.

In another arrangement of the reinforcing elements is illustrated in FIG. 7 and has the reinforcing elements VE arranged in a grid structure or pattern. In this case, the individual elements VE extend parallel to the edges of the cable sleeve insert KE.

Figure 8:
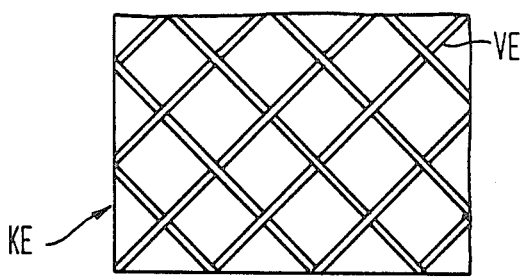
FIG. 8 is a partial plan view with layers removed showing grid-shaped inclusions whose individual elements extend at an angle to each of the side edges of the insert.

In still another modification of the grid-like arrangement for the reinforcing elements Ve is illustrated in FIG. 8 and here the elements extend at an angle relative to the principle direction of the cable sleeve insert KE, for example, at 45° to the axis of the insert and to each edge. In this way, the flexibility and deformability of the cable sleeve insert KE can be influenced.

The spacing between as well as the number of reinforcing elements VE can differ and, respectively, depends on the required stability. The shape of the reinforcing elements can likewise be arbitrarily selected. Thus, strips which are flat, narrow, or multi-edged are just as selectable as strips which have a round or oval cross section. The selection of the material is also fundamentally free but known hot melt adhesive materials, thermo setting plastics, polyesters, electrical press board, cardboard, glass fibers, asbestos fibers, or plastic fibers, such as KEVLAR * fibers, which are known per se, are particularly suitable for this purpose. Combinations of reinforcing elements of this type are also possible.
(Kevlar-fibre is a trademark and refers to fibres which are made of polyparavinylentherephthalamid)

Figure 9:
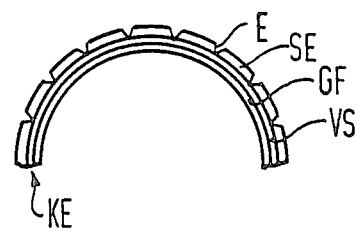
FIG. 9 is a partial end view of a flexible embodiment of the cable sleeve insert.

Another embodiment of the cable sleeve insert KE is shown in FIG. 9 and is a flexible embodiment. In this embodiment, a basic foil GF has the reinforcing elements VS applied and these are either embedded in an activatable layer SE or covered by this layer SE. The uppermost surface of the activated layer SE then has a plurality of channel-like incisions or grooves E extending in the longitudinal direction so that the radial bendability as illustrated in FIG. 9 is increased. The embodiment shown in the FIG. can be applied to a cable sleeve insert Ke which is initially fashioned planar and which is already prebent in a wrapping direction.

This form of FIG. 9, however, can also be viewed for a cable sleeve insert KE which is formed of a pair of stable halfshells. In the parting seams, this half-shell then has fixing or securing devices which will mate with one another.

In both instances, the cable sleeve insert KE is ultimately surrounded with a shrinkable envelope wherein the layer composite occurs as a result of the melting of the facing meltable layers to fuse one to another and will exhibit a high strength which also allows an interior charging pressure. The end terminations comprising the cable introductions can occur in various executions. Given appropriate, essentially longitudinally directed reinforcing elements VS, for example, a conically matching of the cable sleeve inserts KE can also be achieved because, as a result of the adequate heating during the shrinking process, the activatable layer is softened and can be pressed down and adapted to the smaller diameter of the introduced cable in a conically converging fashion by the shrinking envelope. The conically converging adapted pieces, however, can also be formed by corresponding blanks since the pieces fashioned band-like can be cut in an arbitrary way from the cable sleeve insert. Thus, these blanks are then applied to the end face of the wrapper middle part of the cable sleeve insert and are slightly fixed and are coincorporated into a layer composites by means of the subsequent shrinking of the outer envelope.

Figure 10:
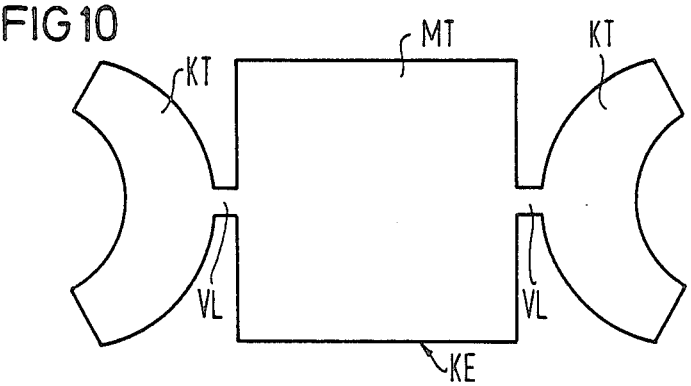
FIG. 10 is a plan view of a initially formed blank for a cable sleeve insert in accordance with the present invention.
Figure 11:
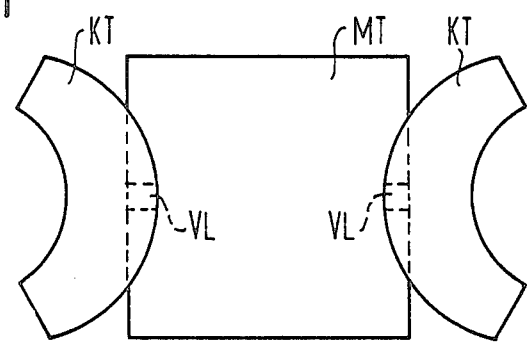
FIG. 11 is a plan view of the insert of FIG. 10 after a first assembly operation.
Figure 12:
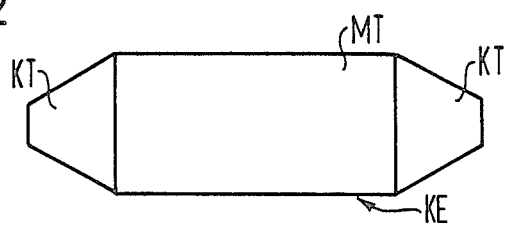
FIG. 12 is a side view of the blank assembled as a cable sleeve insert in accordance with the present invention prior to employment of a shrinkable envelope thereon.

To form a mounted cable sleeve insert KE which has a cylindrical center part MT (FIG. 12) and two conical end parts KT, an initial blank having the shape shown in FIG. 10 is first cut from a layer composite manufactured band-shaped. The blank is composed of a rectangular center part MT and of two conical parts KT which are fastened to the center parts via clips VL. The center part MT serves the purpose of enveloping the structure to be covered, such as, for example, a cable splice or a repair location of a cable, whereas the diameter matching between the center part MT and the introduced article occurs with the two conical end parts KT which likewise are wrapped onto the inserted cable. The conical parts KT are captively connected to the center part by means of the connecting clip VL which serve as an assembly aid when they are folded back onto the center part MT and fixed as illustrated in FIG. 11. Thus, the conical parts KT are already fixed at this point of overlap and then the bending can occur during the wrapping operation. As a result of softening during the shrinking process, these regions are adapted to one another and finally melt to form a firm union.

After forming the cable insert KE (FIG. 12) on the cables, a shrinkable envelope is now applied over the mounted form and the pressure tight union between the envelope and the cable sleeve KE is produced by the shrinkable envelope.

If, however, one wishes to forego the intimate bond between the shrinkable envelope and the cable sleeve insert for certain reasons, then this can be achieved by an inverted wrapping of the cable sleeve insert. In this case, the permeation tight layer of the cable sleeve insert then lies on an outside surface and the activatable layer will lie on the inside surface.

Although various minor modifications may be suggested by those versed in the art, it should be understood that I wish to employ within the scope of the patent granted hereon, all such modifications as reasonably and properly come within the scope of my contribution to the art.

I claim:

1. In a shrinkable cable sleeve composed of a shrinkable outer envelope and an inner cable sleeve insert which is formed of a plurality of layers the improvements comprising said outer envelope having a heat meltable adhesive layer facing the cable sleeve insert and the cable sleeve insert being a layer composite having a basic foil layer distributed over the full surface of the cable insert, a layer of activatable material when subjected to heat and reinforcing elements being arranged on the basic foil layer with the layer of activatable material when subjected to heat and reinforcing elements being arranged on the basic foil layer with the layer of activatable material facing the outer envelope and being a material different than said adhesive layer so that when heat is applied, the layer of activatable material and the heat meltable adhesive layer melt to bond the outer envelope to the cable sleve insert.

2. In a shrinkable cable sleeve according to claim 1, wherein the reinforcing elements are composed of a longitudinally extending rod-shaped elements.

3. In a shrinkable cable sleeve according to claim 1, wherein the reinforcing elements are composed of elements arranged in a grid-like pattern.

4. In a shrinkable cable sleeve according to claim 3, wherein the individual elements of the grid-like pattern of elements are arranged to extend parallel to the edges of the cable sleeve insert.

5. In a shrinkable cable sleeve according to claim 3, wherein the individual elements of the grid-like pattern are arranged to extend an angle relative to the edges of the cable sleeve insert.

6. In a shrinkable cable sleeve according to claim 1, wherein the reinforcing elements have an identical spacing therebetween.

7. In a shrinkable cable sleeve according to claim 1, wherein the individual elements of the reinforcing elements have unequal spacing therebetween.

8. In a shrinkable cable sleeve according to claim 1, wherein the individual elements of the reinforcing elements are fashioned as flat strips.

9. In a shrinkable cable sleeve according to claim 1, wherein the individual elements of the reinforcing elements are fashioned as multi-edge rods.

10. In a shrinkable cable sleeve according to claim 1, wherein the reinforcing elements are formed in a planar sheet-like fashion.

11. In a shrinkable cable sleeve according to claim 1, wherein the reinforcing elements are composed of a material which is activatable by the application of heat, preferably of a hot melt adhesive.

12. In a shrinkable cable sleeve according to claim 1, wherein the reinforcing elements are composed of a polyolefin.

13. In a shrinkable cable sleeve according to claim 12, wherein said polyolefin is a polypropylene.

14. In a shrinkable cable sleeve according to claim 1, wherein the reinforcing elements are formed of a thermo setting plastic.

15. In a shrinkable cable sleeve according to claim 1, wherein the reinforcing elements are formed of a polyester.

16. In a shrinkable cable sleeve according to claim 1, wherein the reinforcing elements are formed of reinforcing fibers selected from a group consisting of glass fibers and plastic fibers.

17. In a shrinkable cable sleeve according to claim 1, wherein the reinforcing elements are formed of chip-like press material selected from a group consisting of cardboards and electrical press boards.

18. In a shrinkable cable sleeve according to claim 1, wherein at least one layer of the cable insert is of a permeation-tight material formed by an aluminum foil.

19. In a shrinkable cable sleeve according to claim 1, wherein the reinforcing inserts form a separate layer in the layer composite.

20. In a shrinkable cable sleeve according to claim 1, wherein the reinforcing elements are embedded in the activatable material.

21. In a shrinkable cable sleeve according to claim 1, wherein the reinforcing elements are identical with the activatable material.

22. In a shrinkable cable sleeve according to claim 1, wherein the layer composite of the cable sleeve insert is manufactured band-like and can be arbitrarily cut into different sizes and shapes.

23. In a shrinkable cable sleeve according to claim 1, wherein the cable sleeve insert is formed of a blank with a wrappable, rectangular center part having a lateral connecting conical part.

24. In a shrinkable cable sleeve according to claim 24, wherein the conical parts are fastened to said center part via connecting clips.

25. In a shrinkable cable sleeve according to claim 1, wherein the cable sleeve insert is formed of relatively stable half-shells.

26. In a shrinkable cable sleeve according to claim 1, wherein the cable sleeve insert comprises channel-shaped incisions extending in a longitudinal direction to increase the radial bendability of the insert.

27. In a shrinkable cable sleeve according to claim 1, wherein the basic foil is composed of aluminum grid weave foil.

28. In a shrinkable cable sleeve according to claim 1, wherein the basic foil of the cable insert is composed of aluminum laminated plastic foil.

29. In a shrinkable cable sleeve according to claim 1, wherein a plastic cover foil is applied to completely cover the cable sleeve insert.

30. In a shrinkable cable sleeve according to claim 1, wherein the insert includes a cover foil of a plastic material arranged in sub-regions on said cable sleeve insert.

31. In a shrinkable cable sleeve according to claim 1, wherein the sleeve insert includes a cover foil of temperature resistant material.

32. In a shrinkable cable sleeve according to claim 1, wherein the cable sleeve insert has lateral, conically adapted regions, said lateral, conical regions being formed of the edge regions of the layer composite of the cable sleeve insert.

33. In a shrinkable cable sleeve according to claim 1, wherein the cable sleeve insert has conical end portions which are secured to a central part of the cable sleeve insert.

34. In a shrinkable cable sleeve according to claim 1, wherein the activable layer of the cable insert and the adhesive layer of the shrinkable envelope have different melting points.

* * * * *